United States Patent
Gotani et al.

(10) Patent No.: US 11,833,916 B2
(45) Date of Patent: Dec. 5, 2023

(54) FOREIGN SUBSTANCE DETECTION DEVICE, ELECTRICITY TRANSMISSION DEVICE, ELECTRICITY RECEPTION DEVICE, AND ELECTRIC POWER TRANSMISSION SYSTEM

(71) Applicant: TDK CORPORATION, Tokyo (JP)

(72) Inventors: Akira Gotani, Tokyo (JP); Kazuki Kondo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 172 days.

(21) Appl. No.: 17/628,700

(22) PCT Filed: Dec. 4, 2020

(86) PCT No.: PCT/JP2020/045218
§ 371 (c)(1),
(2) Date: Jan. 20, 2022

(87) PCT Pub. No.: WO2021/131608
PCT Pub. Date: Jul. 1, 2021

(65) Prior Publication Data
US 2022/0266703 A1   Aug. 25, 2022

(30) Foreign Application Priority Data

Dec. 27, 2019 (JP) .................................. 2019-239626

(51) Int. Cl.
*B60L 53/124* (2019.01)
*H02J 50/12* (2016.01)
(Continued)

(52) U.S. Cl.
CPC .............. *B60L 53/124* (2019.02); *H02J 7/02* (2013.01); *H02J 50/12* (2016.02); *H02J 50/60* (2016.02)

(58) Field of Classification Search
CPC ...................................................... B60L 53/124
(Continued)

(56) References Cited

U.S. PATENT DOCUMENTS

2014/0015522 A1* 1/2014 Widmer .................. H02J 50/60
324/239
2014/0232202 A1   8/2014 Ichikawa et al.
(Continued)

FOREIGN PATENT DOCUMENTS

JP   2017-188662 A   10/2017
JP   2019-002882 A    1/2019
(Continued)

OTHER PUBLICATIONS

Jan. 26, 2021 International Search Report issued in International Patent Application No. PCT/JP2020/045218.

*Primary Examiner* — Joseph Chang
(74) *Attorney, Agent, or Firm* — Oliff PLC

(57) ABSTRACT

A foreign object detection device includes a detection coil unit including a detection coil substrate (220) and a plurality of coils (242), which are mounted on a surface of the detection coil substrate (220) and each include a conductive pattern turned around the Z axis, and a detector (26) connected to the coils (242) to detect the existence of a foreign object on the basis of a vibration signal output when each of the coils (242) is excited. The coils (242) each define an opening. The detection coil substrate (220) has a through hole (228) extending through the detection coil substrate (220), and a component space for accommodating a switch (248) or a wiring pattern (250), within each of the openings of the coils (242) as seen in the Z-axis direction.

15 Claims, 17 Drawing Sheets

(51) Int. Cl.
  *H02J 50/60* (2016.01)
  *H02J 7/02* (2016.01)
(58) Field of Classification Search
  USPC .......................................................... 307/104
  See application file for complete search history.

(56) References Cited

U.S. PATENT DOCUMENTS

2020/0012007 A1  1/2020  Oshima et al.
2020/0070673 A1  3/2020  Nishimura

FOREIGN PATENT DOCUMENTS

WO    2013/051105 A1    4/2013
WO    2019/009241 A1    1/2019

* cited by examiner

FOREIGN SUBSTANCE DETECTION DEVICE, ELECTRICITY TRANSMISSION DEVICE, ELECTRICITY RECEPTION DEVICE, AND ELECTRIC POWER TRANSMISSION SYSTEM

TECHNICAL FIELD

The present disclosure relates to a foreign object detection device, a power transmission device, a power reception device, and a power transfer system.

BACKGROUND ART

Power supply systems have been proposed for wirelessly feeding electric power from a power transmission coil unit to a power reception coil unit provided in a vehicle. Foreign object detection devices have also been developed for detecting a foreign object that unintentionally enters the space between the power transmission coil unit and the power reception coil unit.

For example, Patent Literature 1 discloses a wireless power transfer device including a power supply coil unit provided with sensors for detecting a foreign object. In the configuration illustrated in Patent Literature 1, the sensors include ring-shaped coils. The opening of each sensor, that is, the portion of the substrate surrounded by each ring-shaped coil has a through hole (opening), in which a rib for supporting loads is disposed.

CITATION LIST

Patent Literature

Patent Literature 1: Unexamined Japanese Patent Application Publication No. 2017-188662

SUMMARY OF INVENTION

Technical Problem

In the configuration illustrated in Patent Literature 1, the through holes for accommodating the ribs are provided so as to correspond to the openings of the ring-shaped coils included in the sensors. The openings of the ring-shaped coils thus do not have spaces for accommodating circuit components, such as resonant capacitors, and wires for connecting these components.

If these circuit components and wires are disposed between the ring-shaped coils, this configuration unfortunately increases the interval between the ring-shaped coils and may adversely affect the performance of detection of a foreign object. In contrast, if the circuit components and wires are disposed on both of the outer sides of the ring-shaped coils, this configuration unfortunately increases the size of the substrate and thus leaves room for improvement.

An objective of the present disclosure, which has been accomplished in view of the above situations, is to ensure the high accuracy of detection of a foreign object and maintain the small area of the substrate.

Solution to Problem

In order to solve the above problems, a foreign object detection device according to an aspect of the present disclosure includes: a detection coil unit including a substrate and a plurality of coils mounted on a first surface of the substrate, each of the coils including a first conductive pattern turned around a first axis orthogonal to the first surface; and a detector connected to the coils to detect the existence of a foreign object on the basis of a vibration signal output when each of the coils is excited. The coils each define an opening, and the substrate includes a through hole and a component space within each of the openings of the coils as seen in a direction of the first axis, the through hole extending through the substrate, the component space accommodating a component or a wire.

A power transmission device according to another aspect of the present disclosure includes: a power transmission coil including a coiled conductive wire; and the above-described foreign object detection device.

A power reception device according to another aspect of the present disclosure includes: a power reception coil including a coiled conductive wire; and the above-described foreign object detection device.

A power transfer system according to another aspect of the present disclosure includes: the above-described power transmission device; and a power reception device. Each of the through holes has a rectangular or elliptical shape as seen in the direction of the first axis, and the long-side or long-axis direction of the through hole is parallel to the straightforward direction of a moving body in which the power reception device is installed.

A power transfer system according to another aspect of the present disclosure includes: a power transmission device; and the above-described power reception device. Each of the through holes has a rectangular or elliptical shape as seen in the direction of the first axis, and the long-side or long-axis direction of the through hole is parallel to the straightforward direction of a moving body in which the power reception device is installed.

Advantageous Effects of Invention

The above-described structure can achieve concentrated arrangement of the coils, ensure the high accuracy of detection of a foreign object, and maintain the small area of the substrate.

DESCRIPTION OF EMBODIMENTS

Figure 1:
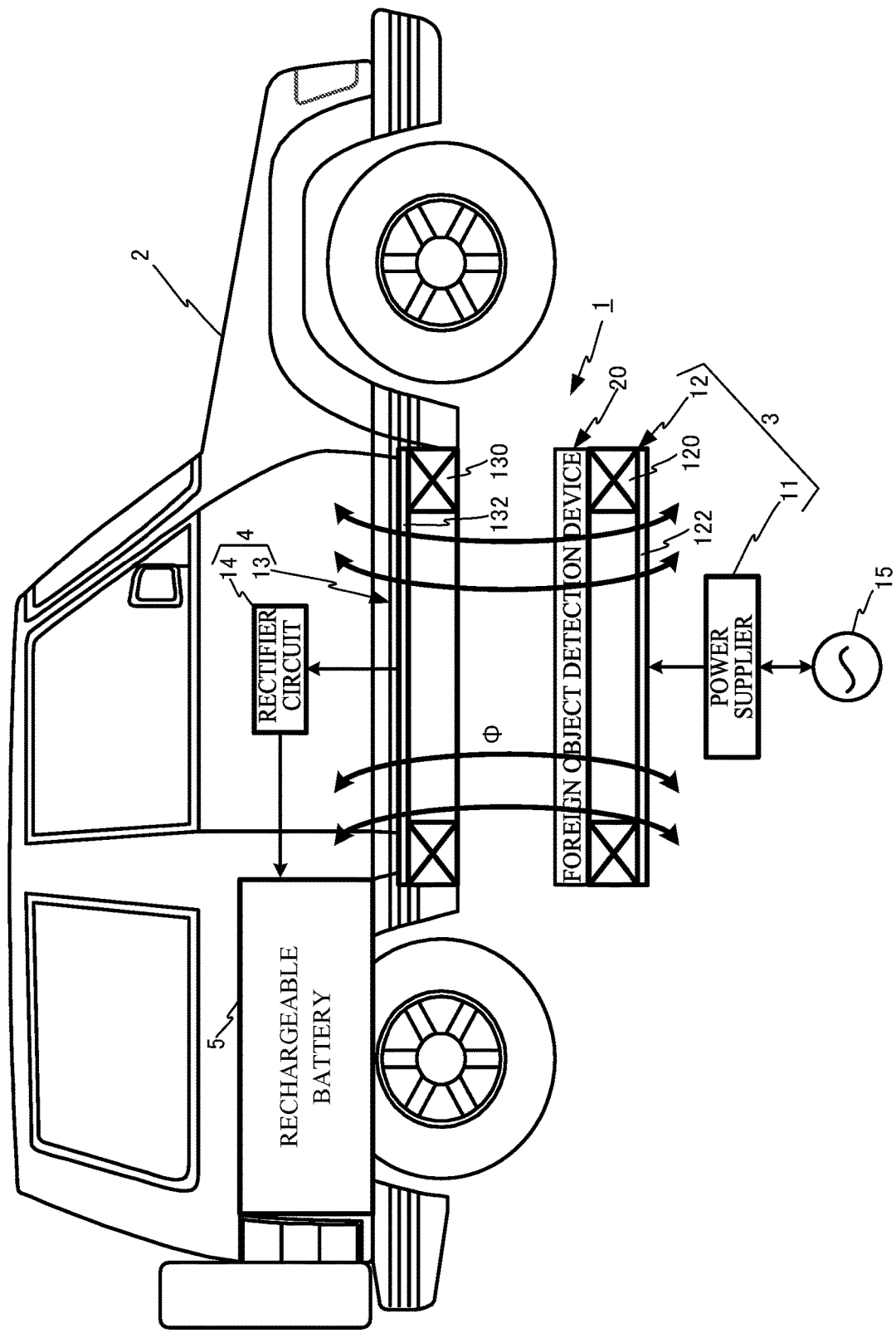
FIG. 1 illustrates an exemplary configuration of a power transfer system to which a foreign object detection device according to the present disclosure is applied.

A foreign object detection device, a power transmission device, a power reception device, and a power transfer system according to an embodiment of the present disclosure are described below. In the following description and drawings, the corresponding components are provided with the same reference symbol. The drawings illustrate a coordinate system including the X axis (first direction), the Y axis (second direction), and the Z axis (first axis) orthogonal to each other, so as to clarify the directions of components. The features, such as the number, shapes, dimensions, and dimensional ratios, of components illustrated in the drawings are mere examples and not intended to limit the technical scope of the present disclosure.

A power transfer system 1 according to the embodiment can be applied to various devices. Examples of the devices include mobile devices, such as smartphones, electric vehicles, and industrial equipment. The following description is directed to an example in which the power transfer system 1 is used for charging a rechargeable battery 5 of an electric vehicle 2.

As illustrated in FIG. 1, the power transfer system 1 according to the embodiment is a wireless power transfer system to wirelessly transfer electric power from a power transmission side to a power reception side. The power transfer system 1 includes a power transmission device 3, a power reception device 4, and a foreign object detection device 20. The power transmission device 3 is a wireless power transmission device to wirelessly transmit AC power to the electric vehicle 2. The power transmission device 3 includes a power supplier 11 and a power transmission coil unit 12.

The power supplier 11 generates AC power at a frequency of 75 to 90 kHz from a commercial power supply 15 to be transmitted, for example, and feeds the generated power to the power transmission coil unit 12.

Figure 2:
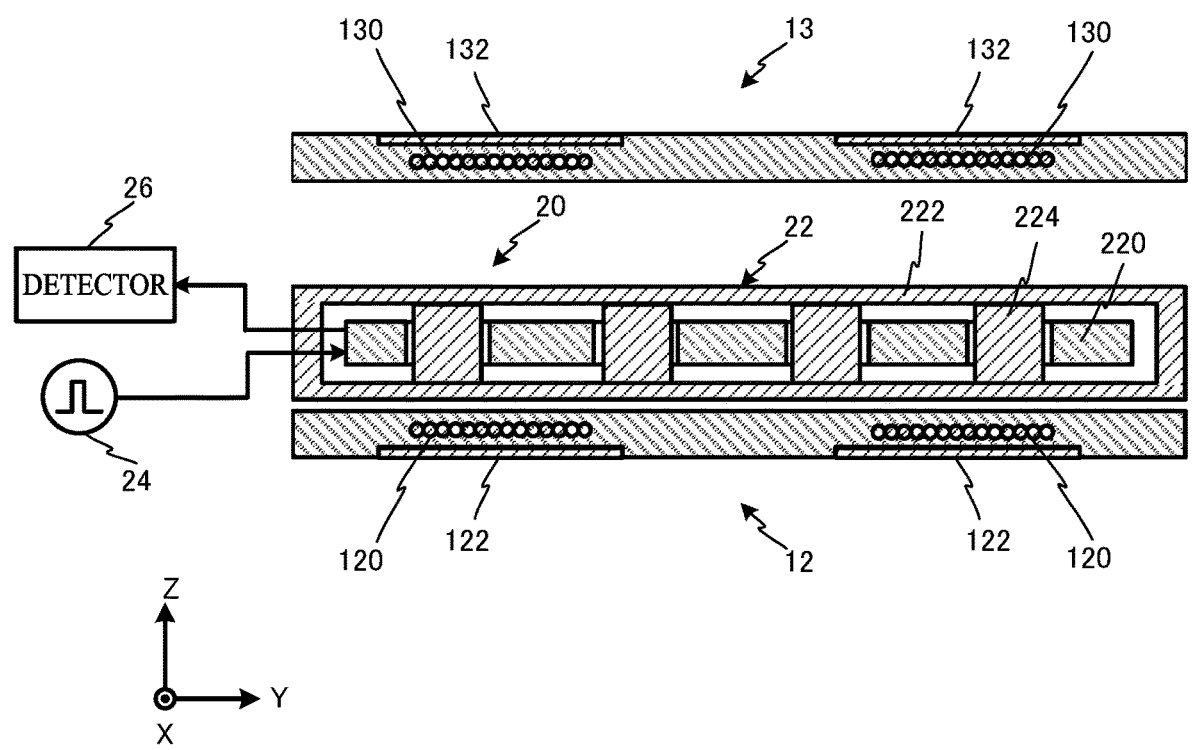
FIG. 2 is a sectional view illustrating configurations of a power transmission coil unit and the foreign object detection device illustrated in FIG. 1, and corresponds to a sectional view taken along the line II-II of FIG. 3.

As illustrated in FIG. 2, the power transmission coil unit 12 includes a magnetic plate 122 made of a magnetic material, such as ferrite, and a power transmission coil 120 including a conductive wire coiled in a flat spiral on the magnetic plate 122. The power transmission coil 120 is fed with the AC power from the power supplier 11 and induces an alternating magnetic flux $\Phi$.

The power reception device 4 illustrated in FIG. 1 is a wireless power reception device to wirelessly receive the electric power from the power transmission device 3 and charge the rechargeable battery 5. The power reception device 4 includes a power reception coil unit 13 and a rectifier circuit 14. As illustrated in FIG. 2, the power reception coil unit 13 includes a magnetic plate 132, and a power reception coil 130 including a conductive wire coiled in a flat spiral on the magnetic plate 132. The power reception coil unit 13 faces the power transmission coil unit 12 when the electric vehicle 2 stops at a predetermined position. When the power transmission coil 120 receives electric power from the power supplier 11 and induces the alternating magnetic flux $\Phi$, which interlinks with the power reception coil 130, so that an induced electromotive force is generated at the power reception coil 130.

The rectifier circuit 14 illustrated in FIG. 1 rectifies and smooths the induced electromotive force generated at the power reception coil 130, and feeds the resulting DC power to the rechargeable battery 5 to charge the rechargeable battery 5. A charging circuit may be disposed between the rectifier circuit 14 and the rechargeable battery 5.

The foreign object detection device 20 detects whether any foreign object, such as a metal fragment, exists between the power transmission coil unit 12 and the power reception coil unit 13. As illustrated in FIG. 2, the foreign object detection device 20 includes a detection coil unit 22, a pulse generator 24, and a detector 26.

The detection coil unit 22 has a flat-plate shape and is disposed on the upper surface of the power transmission coil unit 12. The detection coil unit 22 and the power transmission coil unit 12 are installed in a floor surface of a parking lot, for example.

The detection coil unit 22 includes a detection coil substrate 220, a case 222, and a plurality of ribs 224.

Figure 3:
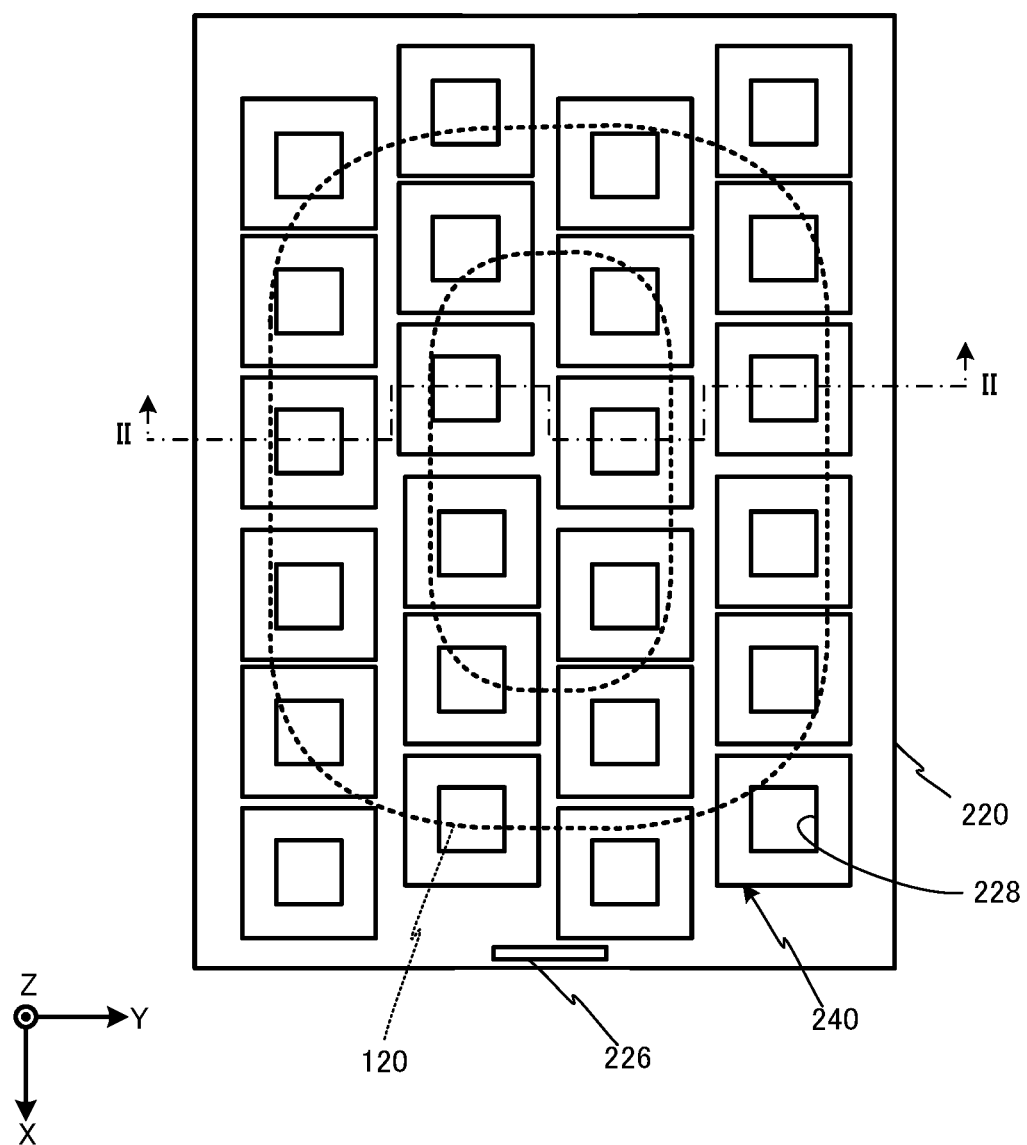
FIG. 3 is a plan view illustrating configurations of the power transmission coil unit and the foreign object detection device illustrated in FIG. 1.

The detection coil substrate 220 is made of a magnetically permeable material, such as resin. As illustrated in FIG. 3, which is a view (hereinafter referred to as "plan view") as seen in the Z-axis direction, the detection coil substrate 220 includes thereon 24 loop coils 240 arranged in a matrix in the X-axis direction (first direction) and the Y-axis direction (second direction) to cover most of the power transmission coil unit 12, and an external connector 226 to connect the individual loop coils 240 to the pulse generator 24 and the detector 26. The detection coil substrate 220 also has through holes 228 at the respective centers of the loop coils 240, and the respective through holes 228 accommodate the ribs 224. In this embodiment, each of the through holes 228 has a square shape as seen in the Z-axis direction and has the center coinciding with the center of the corresponding loop coil 240. An excessively large through hole 228 would reduce the space for accommodating circuit components, wires, and the like. The through hole 228 is therefore preferably as small as possible provided that the rib 224 can readily be inserted into the through hole 228. The through holes 228 are not necessarily provided for all the loop coils 240 and may be provided only at the positions corresponding to the ribs 224.

The case 222 illustrated in FIG. 2 houses the detection coil substrate 220.

The ribs 224 are disposed in the individual through holes 228 provided in the detection coil substrate 220 to support the top and bottom plates of the case 222 against loads.

The pulse generator 24 generates a pulsed voltage for detection of a foreign object and applies the pulsed voltage to a selected loop coil 240. The detector 26 processes a responding vibration signal output from the loop coil 240 when the loop coil 240 is excited by application of the pulsed voltage, and thus detects whether a foreign object exists.

Figure 4:
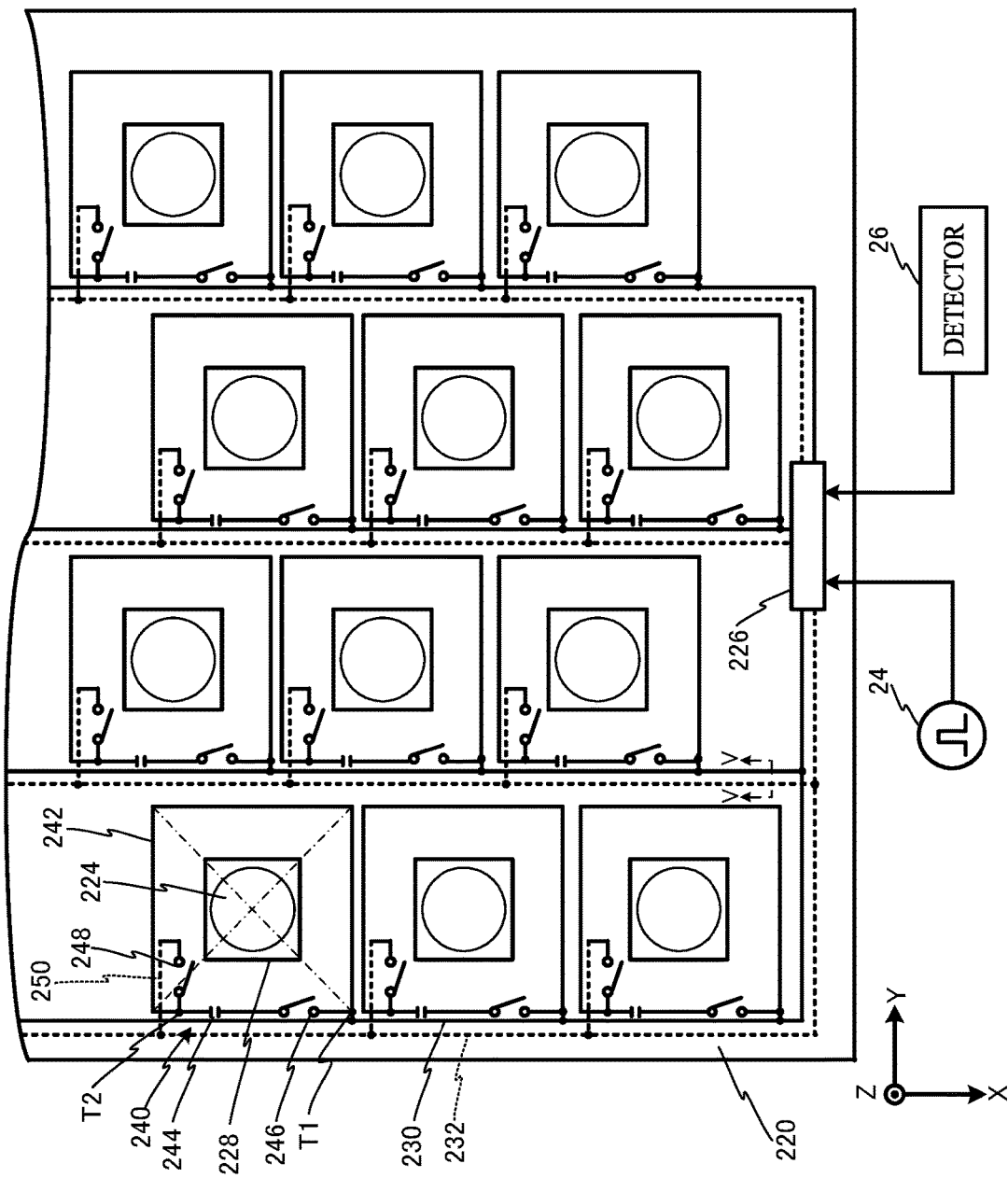
FIG. 4 is a plan view of a detection coil unit of the foreign object detection device illustrated in FIG. 1.

The loop coils 240 are described in detail below with reference to FIG. 4, which illustrates the circuit patterns formed on the detection coil substrate 220. FIG. 4 illustrates only twelve loop coils 240 of the loop coils 240 illustrated in FIG. 3 so as to improve the visibility of the figure.

As illustrated in FIG. 4, the loop coils 240 have configurations substantially identical to each other. Each of the loop coils 240 includes a coil 242, a capacitor 244, switches 246 and 248, and a wiring pattern 250. The reference symbols are provided to only a single loop coil 240 so as to improve the visibility of the figure.

The coil 242 includes a conductive pattern looped one or more times around the Z axis (first axis) on the upper surface (first surface) of the detection coil substrate 220, for example. The conductive pattern has terminals T1 and T2 at the respective ends.

The one terminal T1 of the coil 242 is connected to the first connecting line 230 and one terminal of the switch 246. The other terminal T2 of the coil 242 is connected to one terminal of the capacitor 244 and one terminal of the switch 248. The other terminal of the switch 248 is connected to one end of the wiring pattern 250. The wiring pattern 250 extends through a via hole to the lower surface (second surface) of the detection coil substrate 220, then further extends on the lower surface, and leads to the second connecting line 232. The other terminal of the capacitor 244 is connected to the other terminal of the switch 246.

The switches 246 and 248 are turned on (in the conductive state) or off (in the non-conductive state), under the control of the detector 26 via a control line, which is not illustrated. The switch 246 serves to cause the connection of the coil 242 to the capacitor 244 to be switched between the conductive state and the non-conductive state. While the switch 246 is on, the coil 242 and the capacitor 244 configure a resonant circuit. The switch 248 serves to cause the connection of the resonant circuit to the pulse generator 24 to be switched between the conductive state and the non-conductive state. That is, while the switches 246 and 248 are both on, the coil 242 and the capacitor 244 configure a resonant circuit, which receives a pulsed voltage applied from the pulse generator 24 via the external connector 226, the first connecting line 230 and the second connecting line 232, and the terminals T1 and T2. In contrast, the voltage between both terminals of the resonant circuit, that is, the voltage between the terminals T1 and T2 is guided to the detector 26 via the first connecting line 230 and the second connecting line 232, and the external connector 226.

While the switches 246 and 248 are both off, the coil 242 and the capacitor 244 do not configure a resonant circuit, and are electrically disconnected from the first connecting line 230 and the second connecting line 232 and from the pulse generator 24 and the detector 26.

Figure 5:
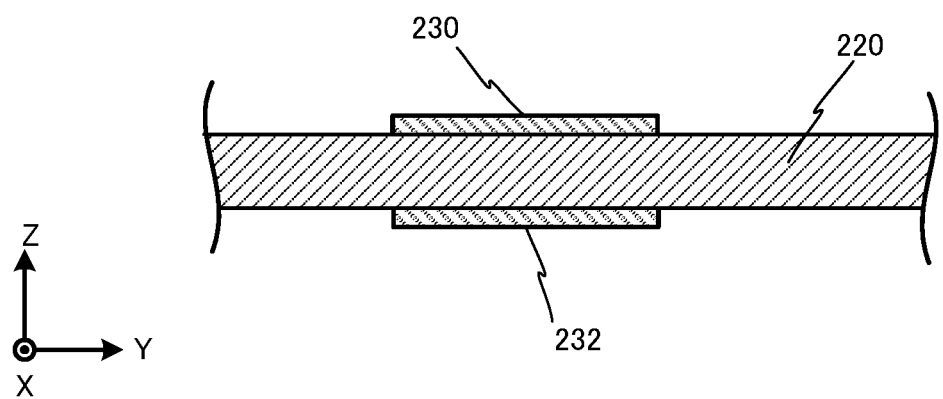
FIG. 5 is a sectional view taken along the line V-V of FIG. 4.

FIG. 5 is a sectional view taken along the line V-V of FIG. 4. The first connecting line 230 and the second connecting line 232 extend on the upper and lower surfaces of the detection coil substrate 220 while being at least partially overlapped with each other, so as to reduce the area of the detection coil substrate 220 occupied by the connecting lines. The first connecting line 230 and the second connecting line 232 lead to the external connector 226. In this embodiment, the first connecting line 230 and the second connecting line 232 are overlapped with each other, as illustrated in FIG. 5. FIG. 4 illustrates the first connecting line 230 and the second connecting line 232 in a distinguishable manner, so as to facilitate understanding of the wiring.

Figure 6:
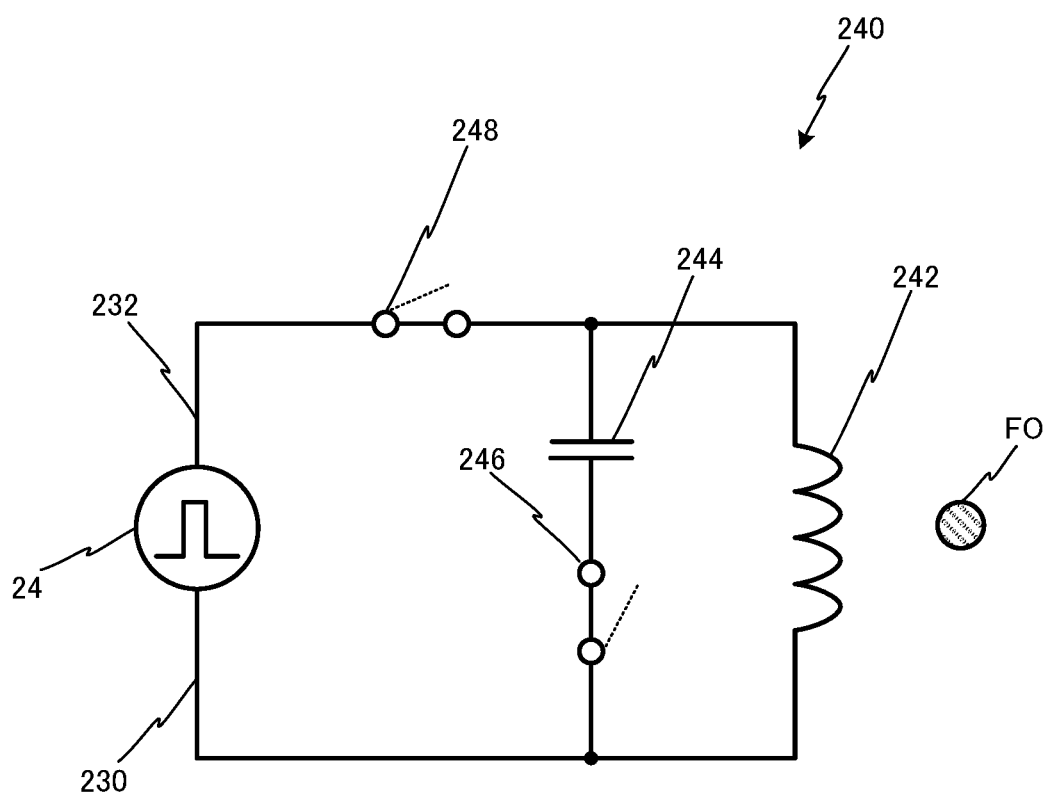
FIG. 6 illustrates an exemplary equivalent circuit of the resonant circuit configured by a coil and a capacitor illustrated in FIG. 4, and an exemplary foreign object in the vicinity of the circuit.
Figure 7:
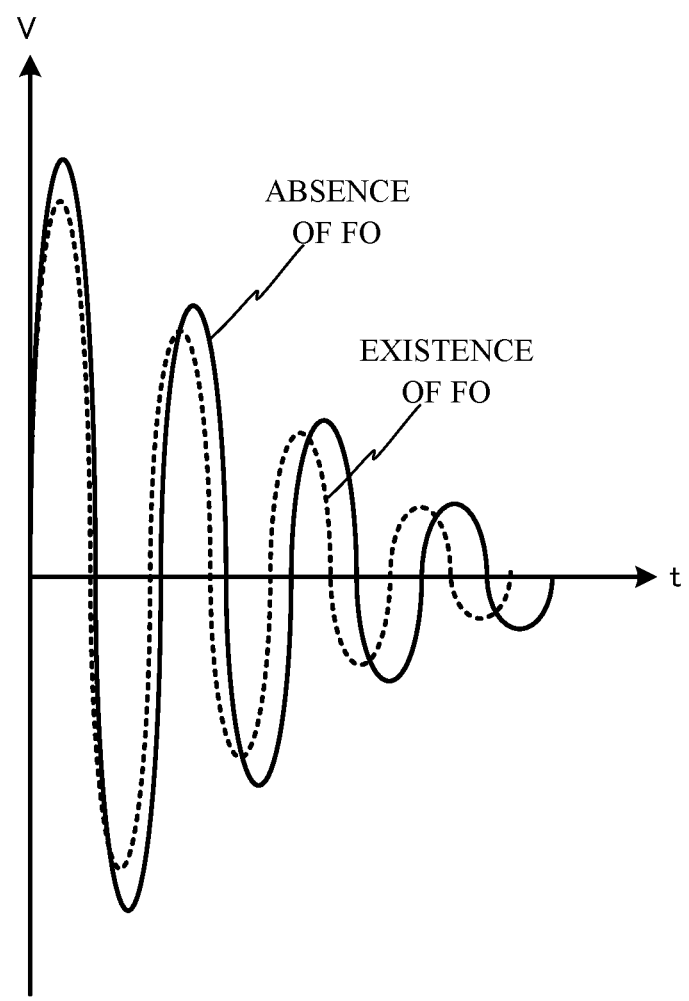
FIG. 7 illustrates an exemplary transitional change in the voltage between both terminals of the resonant circuit illustrated in FIG. 6 in response to application of a pulsed voltage.

FIG. 6 illustrates an exemplary equivalent circuit of the resonant circuit configured by the coil 242 and the capacitor 244, and an exemplary foreign object (FO) in the vicinity of the circuit. FIG. 7 illustrates an exemplary transitional change in a voltage V (responding signal) in the resonant circuit generated in response to application of a single pulsed voltage from the pulse generator 24 to the resonant circuit.

In the case where the switch 246 is closed and causes the coil 242 and the capacitor 244 to configure a resonant circuit, when the switch 248 is closed and allows a single pulsed voltage to be applied from the pulse generator 24, the voltage between both terminals of the resonant circuit, that is, the voltage V between the terminals T1 and T2 corresponds to a vibration signal of which the peak value gradually attenuates as the time t passes.

The description assumes that the voltage V when no foreign object FO exists in the vicinity of the coil 242 corresponds to a vibration signal having the waveform represented by the solid line in FIG. 7. In contrast, the existence of any foreign object FO, such as a metal or magnetic object, in the vicinity of the coil 242 causes a variation in the inductance of the coil 242. Accordingly, when any foreign object FO exists in the vicinity of the coil 242, the frequency of a vibration signal of the voltage V between both terminals of the resonant circuit deviates from the frequency of the vibration signal in the case of no foreign object, has a different attenuation level, or has a disturbed waveform, as represented by the dotted line in FIG. 7. Such a deviation in the frequency, a disturbance of the waveform, and the like of the vibration signal of the voltage V between both terminals of the resonant circuit are analyzed at the detector 26 to determine whether any foreign object FO exists in the vicinity of the coil 242.

Figure 8:
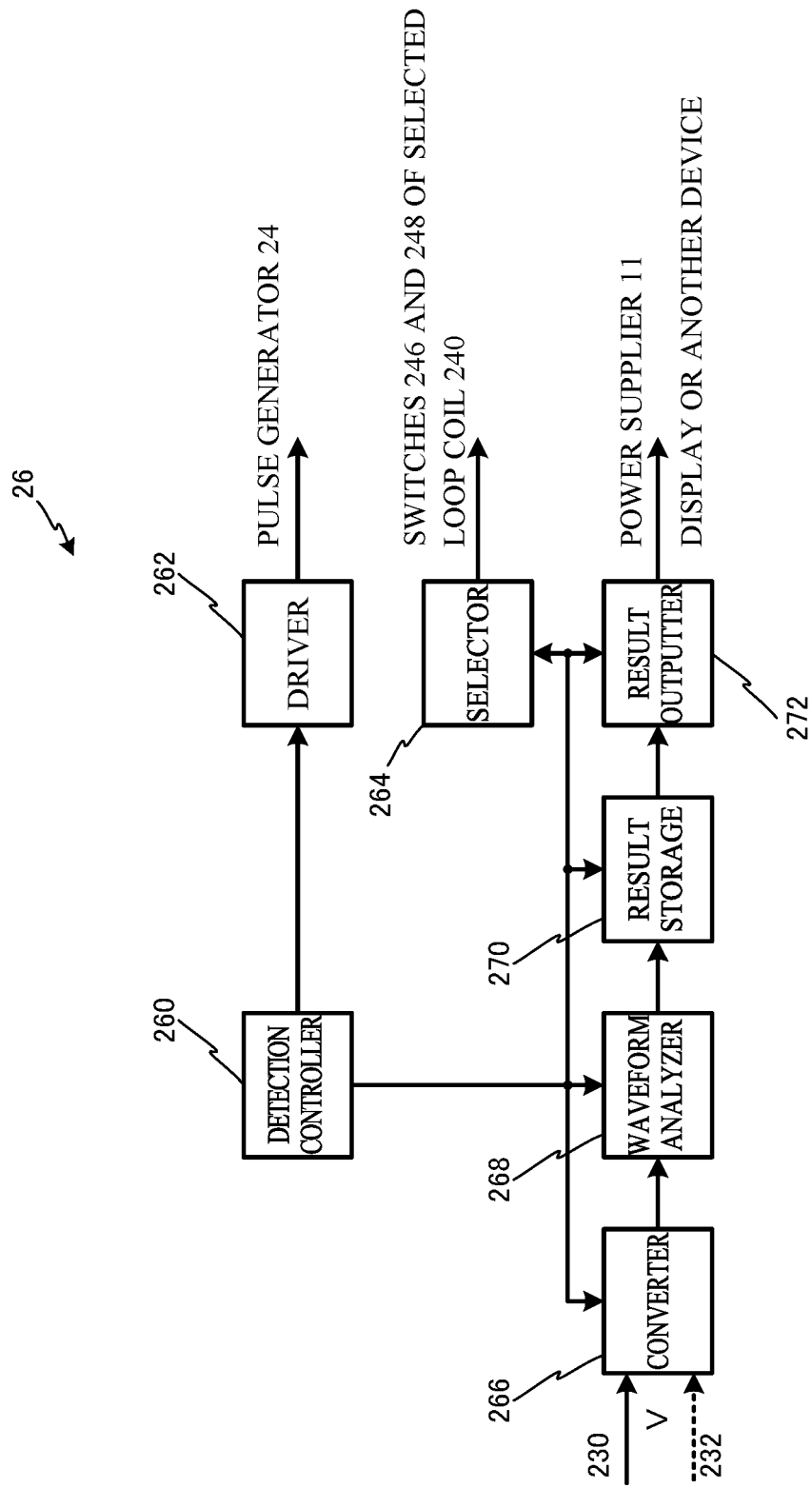
FIG. 8 is a block diagram illustrating a configuration of a detector illustrated in FIGS. 2 and 4.

FIG. 8 illustrates an exemplary configuration of the detector 26. The detector 26 is achieved by, for example, a computer including various interfaces, such as central processing unit (CPU), memory, and analog/digital (A/D) conversion device, and operational programs.

As illustrated in FIG. 8, the detector 26 has a functional configuration including a detection controller 260, a driver 262, a selector 264, a converter 266, a waveform analyzer 268, a result storage 270, and a result outputter 272.

The detector 26 causes these components to select any of the 24 loop coils 240, turn on the switches 246 and 248 of the selected loop coil 240, turn off the switches 246 and 248 of the loop coils 240 that are not selected, and detect the existence of a foreign object FO in the vicinity of the selected loop coil 240. The detector 26 conducts such a process of detecting the existence of a foreign object sequentially for all the 24 loop coils 240 to detect the existence of a foreign object FO in the vicinity of the individual 24 loop coils 240, and outputs results of the detection.

The detection controller 260 controls operations of the individual components of the detector 26, so as to detect whether any foreign object exists in the vicinity of the individual 24 loop coils 240, and output results of the detection.

The selector 264 selects any one of the 24 loop coils 240 under the control of the detection controller 260. The selector 264 then turns on the switches 246 and 248 of the selected loop coil 240.

After completion of the selection of the loop coil 240 and turning on of the switches 246 and 248 at the selector 264, the driver 262 drives the pulse generator 24 under the control of the detection controller 260. The pulse generator 24 then outputs a single pulsed voltage. This pulsed voltage is applied to the resonant circuit via the external connector 226, the first connecting line 230 and the second connecting line 232, the terminals T1 and T2, and the switches 246 and 248 in the on states. Simultaneously, the voltage V between the terminals T1 and T2 of the resonant circuit is guided to the converter 266 via the first connecting line 230 and the second connecting line 232, and the external connector 226.

The converter 266 sequentially converts the waveform of the guided voltage in an analog format into data in a digital format and outputs the resulting data to the waveform analyzer 268, under the control of the detection controller 260.

The waveform analyzer 268 analyzes the input data on the voltage waveform and acquires the frequency of the voltage waveform, attenuation rate, and disturbance of the waveform, under the control of the detection controller 260. The waveform analyzer 268 determines that a foreign object exists in the vicinity of the selected loop coil 240, for example, when the frequency and the attenuation rate of the voltage waveform deviate from predetermined ranges, or when the voltage waveform has features implying the existence of a foreign object.

The waveform analyzer 268 causes the detection results indicating whether any foreign object exists in the vicinity of the individual 24 loop coils 240 to be stored into the result storage 270.

The result outputter 272 outputs the detection results stored in the result storage 270 to an output device, such as display, to present the detection results to a user, under the control of the detection controller 260.

The result outputter 272 also outputs the detection results stored in the result storage 270 to the power supplier 11. In the case of a detection result indicating the existence of a foreign object, the result outputter 272 immediately outputs the detection result to the power supplier 11. When a detection result input before the start of wireless power transfer indicates the existence of a foreign object, the power supplier 11 does not start the operation of wireless power transfer. When a detection result input during wireless power transfer indicates the existence of a foreign object, the power supplier 11 immediately stops the operation of wireless power transfer. In contrast, in the case of detection results indicating the absence of a foreign object, the result outputter 272 outputs the detection results to the power supplier 11 at regular intervals. When detection results input at regular intervals during a predetermined period before the start of wireless power transfer indicate the absence of a foreign object, the power supplier 11 determines that no foreign object exists, and starts the operation of wireless power transfer. When detection results input at regular intervals during wireless power transfer indicate the absence of a foreign object, the power supplier 11 continues the operation of wireless power transfer.

A foreign object detecting process executed in the foreign object detection device 20 is described below with reference to the flowchart of FIG. 9.

Figure 9:
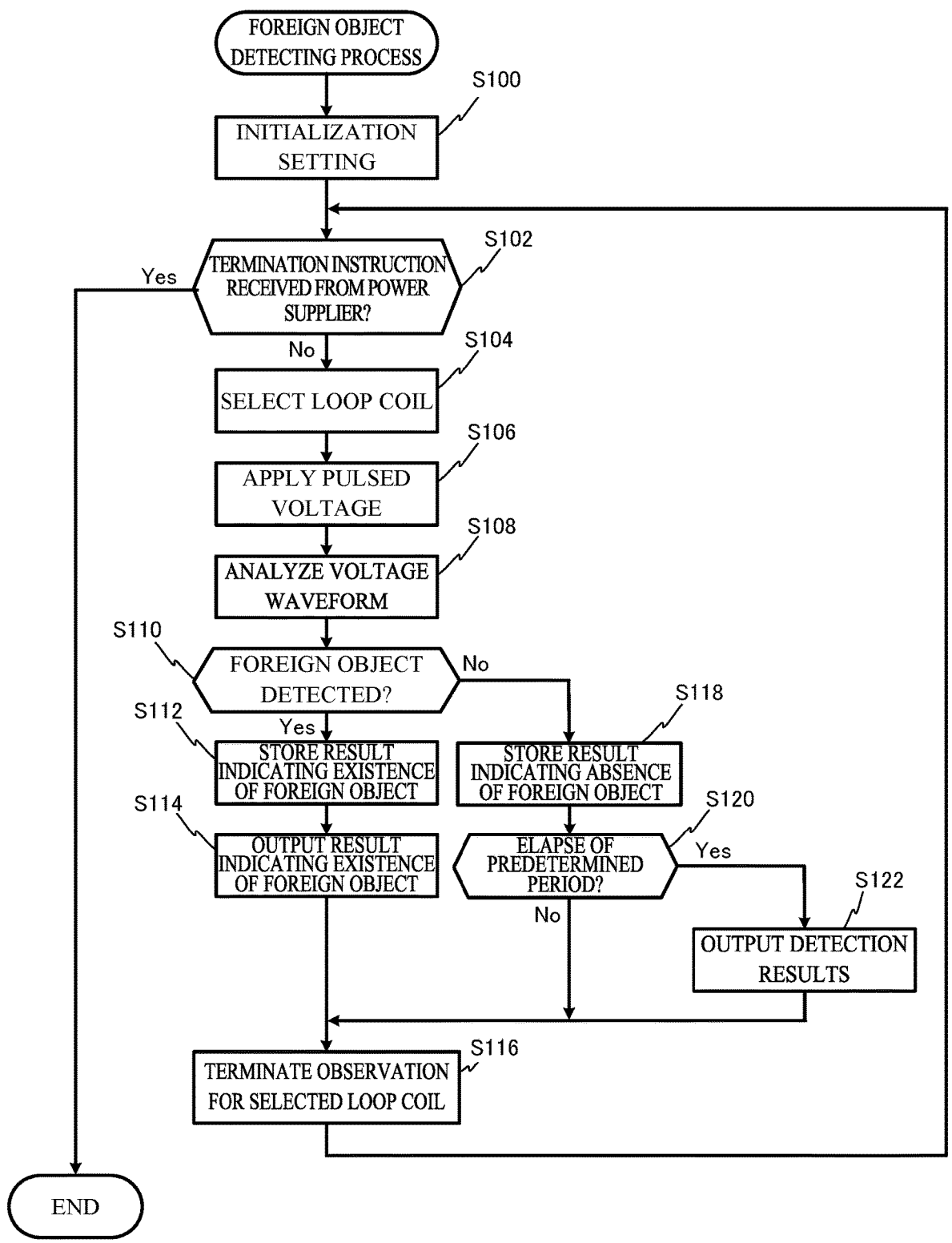
FIG. 9 is a flowchart of a foreign object detecting process executed in a foreign object detection device according to the embodiment.

When being activated in response to an instruction from the power supplier 11, the foreign object detection device 20 starts the foreign object detecting process illustrated in FIG. 9. First, in Step S100, the detection controller 260 of the detector 26 causes the selector 264 to execute an initialization setting step, such as turning off of the switches 246 and 248 of all the 24 loop coils 240.

Then, in Step S102, the detection controller 260 determines whether an instruction to terminate the foreign object detecting process has been received from the power supplier 11. When a termination instruction has been received (Step S102: Yes), the detection controller 260 terminates the ongoing foreign object detecting process.

In contrast, when no termination instruction has been received (Step S102: No), the detection controller 260 causes the selector 264 to select one of the unprocessed loop coils 240 in Step S104, in a cycle of sequential execution of the foreign object detecting process for the 24 loop coils 240. In the case of no unprocessed loop coil 240, the detection controller 260 starts a new cycle and causes the selector 264 to select any one loop coil 240. The detection controller 260 then causes the selector 264 to turn on the switches 246 and 248 of the selected loop coil 240.

In Step S106, the detection controller 260 causes the driver 262 to drive the pulse generator 24 so that the pulse generator 24 outputs a pulsed voltage. This pulsed voltage is applied to the resonant circuit configured by the coil 242 and the capacitor 244 of the selected loop coil 240. The detection controller 260 causes the converter 266 to convert the voltage V guided via the first connecting line 230 and the second connecting line 232 into data in a digital format, and output the resulting data to the waveform analyzer 268.

In Step S108, the detection controller 260 causes the waveform analyzer 268 to analyze the data indicating the voltage waveform, and determine whether any foreign object exists in the vicinity of the selected loop coil 240.

In Step S110, the detection controller 260 determines whether the waveform analyzer 268 determines that a foreign object exists in the vicinity of the selected loop coil 240. When any foreign object is detected in the vicinity of the selected loop coil 240 (S110: Yes), the detection controller 260 proceeds to Step S112. In contrast, when no foreign object is detected (S110: No), the detection controller 260 proceeds to Step S118.

In Step S112, the detection controller 260 controls the waveform analyzer 268 so that the waveform analyzer 268 causes a result indicating that a foreign object FO is detected in the vicinity of the selected loop coil 240, to be stored into the result storage 270.

In Step S114, the detection controller 260 causes the result outputter 272 to notify the power supplier 11 of the result indicating that a foreign object is detected. In accordance with this notification, the power supplier 11 does not start the operation of wireless power transfer before the start of wireless power transfer, or immediately stops the operation of wireless power transfer during wireless power transfer. The result outputter 272 also outputs the result indicating that a foreign object is detected to an output device, such as display, to present the result to the user.

In Step S116, the detection controller 260 causes the selector 264 to turn off the switches 246 and 248 of the loop coil 240 selected in Step S104, and returns to Step S102.

In Step S118, the detection controller 260 controls the waveform analyzer 268 so that the waveform analyzer 268 causes a result indicating that no foreign object FO is detected in the vicinity of the selected loop coil 240, to be stored into the result storage 270.

In Step S120, the detection controller 260 determines whether a predetermined period has elapsed since the previous notification of detection results.

When the predetermined period has elapsed since the previous notification of detection results (Step S120: Yes), the detection controller 260 causes the result outputter 272 to notify the power supplier 11 of the detection results accumulated in the result storage 270. The power supplier 11 determines whether only the detection results indicating the absence of a foreign object have been input for the predetermined period before the start of wireless power transfer, or continues the operation of wireless power transfer during wireless power transfer. The result outputter 272 also outputs the results indicating that no foreign object is detected to the output device, such as display, to present the results to the user. After the output of the detection results in Step S122, the process goes to Step S116 described above.

In contrast, when the predetermined period has not elapsed since the previous notification of detection results in Step S120 (Step S120: No), the process goes to Step S116 described above.

Through the above process, the foreign object detection device 20 is able to detect the existence of a foreign object FO in the power transfer system 1.

The detection coil unit 22 having the above configuration is described in more detail below.

Figure 10A:
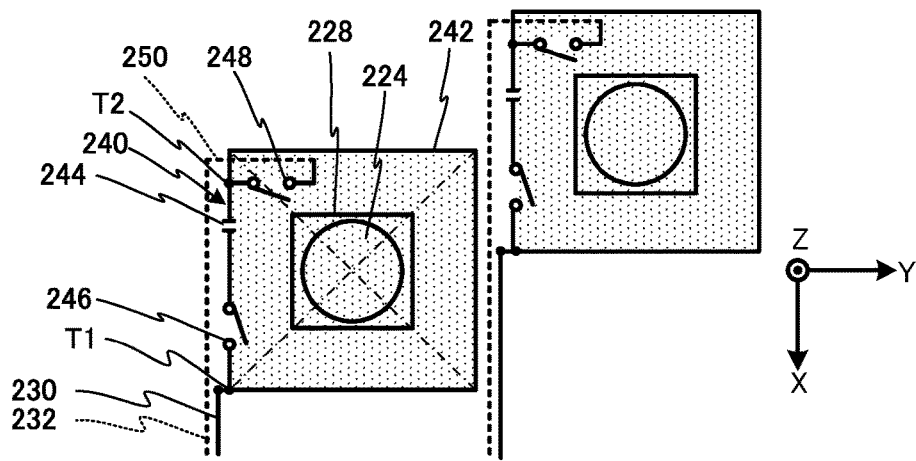
FIG. 10A is an enlarged plan view of two of the loop coils illustrated in FIG. 4 adjacent to each other in the Y direction.

As illustrated in the enlarged view of FIG. 10A, the detection coil substrate 220 has relatively small through holes 228, in which the corresponding ribs 224 are disposed, within the openings (shaded portions) of the respective coils 242 in this embodiment. The remaining spaces (component spaces) accommodate components and wires, such as the switch 248 and the wiring pattern 250, for feeding a pulsed voltage to a resonant circuit.

The first connecting line 230 and the second connecting line 232 are disposed on the left of a column of the loop coils 240 while being overlapped with each other in a plan view. The loop coils 240 in the adjacent columns are shifted by approximately a half-length of the loop coil 240 in the X direction in a plan view. The loop coils 240 adjacent in the Y direction therefore have a small interval therebetween, thereby maintaining the small area of the substrate and ensuring the relatively high accuracy of detection of a foreign object.

Figure 10B:
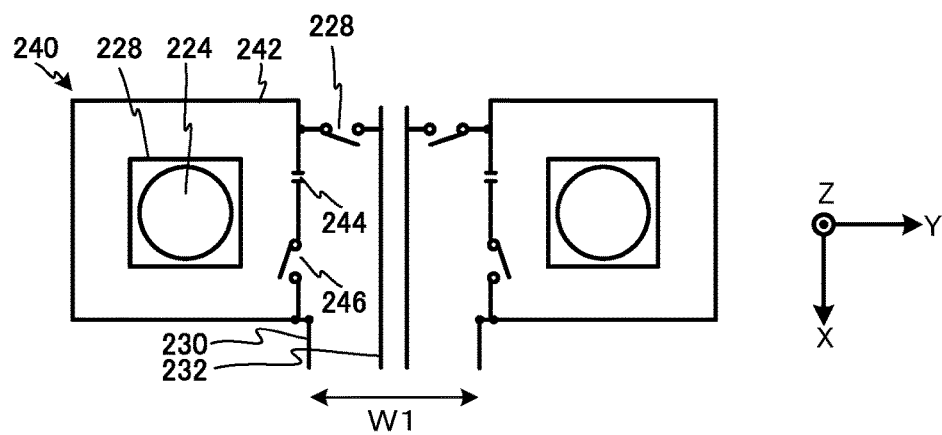
FIG. 10B illustrates a comparative example of arrangement of the loop coils.

In contrast, in a comparative example in which the circuit components and wires are disposed between the coils 242 adjacent in the Y direction as illustrated in FIG. 10B, the interval between the coils 242 is increased by a width approximately equal to the interval W1, thereby impairing the performance of detection of a foreign object.

Figure 10C:
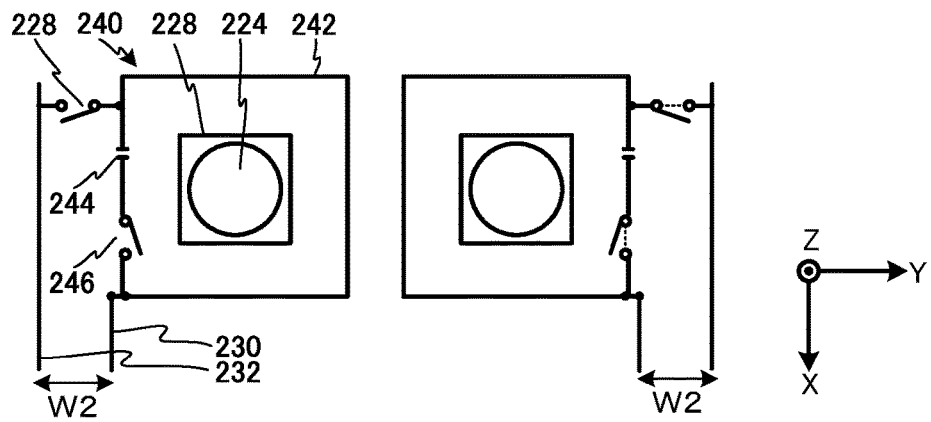
FIG. 10C illustrates a comparative example of arrangement of the loop coils.

In another comparative example in which the circuit components and wires are disposed on both of the outer sides of the coils 242 adjacent in the Y direction as illustrated in FIG. 10C, the area of the substrate is expanded by a width approximately equal to the twice of the interval W2.

The configuration in this embodiment can maintain the high load resistance of the case 222 of the foreign object detection device 20 because of the ribs 224 disposed in the respective through holes 228 corresponding to all the loop coils 240. Alternatively, the ribs 224 may be disposed in the through holes 228 corresponding to some of the loop coils 240.

Modification

Although the foreign object detection device 20 (detection coil unit 22) is mounted on the upper surface of the power transmission coil unit 12 in the above-described embodiment, the foreign object detection device 20 (detection coil unit 22) may also be mounted on the lower surface of the power reception coil unit 13 to detect a foreign object.

Alternatively, the power transmission coil unit 12 and the foreign object detection device 20 may be combined and accommodated in the same housing as an integrated device, to thereby configure the power transmission coil unit 12 including the foreign object detection device 20. The structures in this case are substantially identical to those in the above-described embodiment. Also, the power reception coil unit 13 and the foreign object detection device 20 may be combined and accommodated in the same housing as an integrated device, to thereby configure the power reception coil unit 13 including the foreign object detection device 20.

Figure 11:
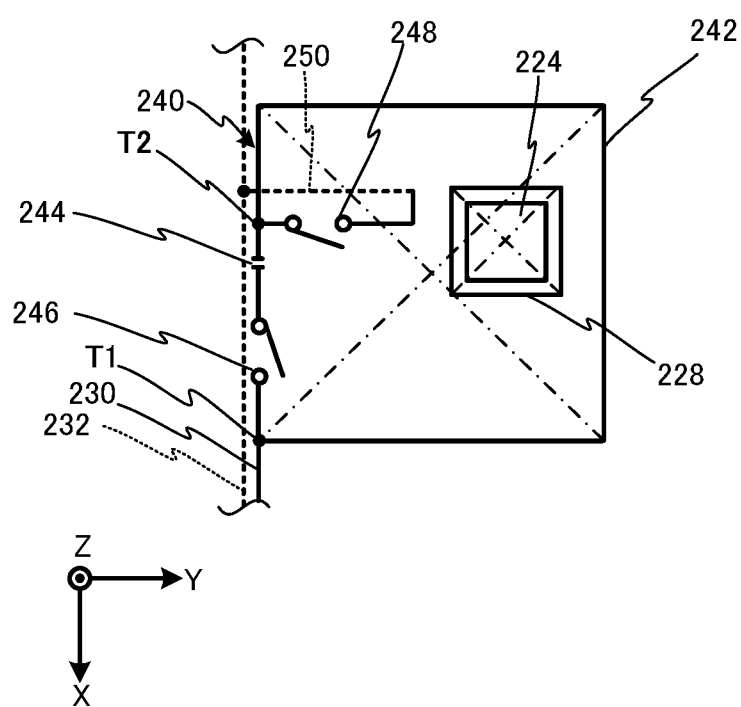
FIG. 11 illustrates a modification of the loop coil illustrated in FIG. 4.

The positions, shapes, and sizes of the through holes 228 and the ribs 224 provided within the openings of the coils 242 may be modified as appropriate. For example, FIG. 11 illustrates an example in which the center of the through hole 228 is deviated from the center of the loop coil 240. In the structure illustrated in FIGS. 4 and 10A, the center of the coil 242 coincides with the center of the through hole 228. In contrast, in the structure illustrated in FIG. 11, the center of the through hole 228 is shifted from the center of the coil 242 to a position further from the first connecting line 230 and the second connecting line 232.

This structure can ensure a relatively larger space in the opening on the side adjacent to the first connecting line 230 and the second connecting line 232 in comparison to the structure in which the center of the through hole 228 coincides with the center of the coil 242, and this larger space can achieve concentrated arrangement of the circuit components. For example, if the center of the through hole 228 is shifted from the center of the coil 242 to a position further from the first connecting line 230 and the second connecting line 232, the switch 248 can be disposed closer to the center of the coil 242. This structure can extend the pattern length of the coil 242 (that is, the length from the terminal T1 to the terminal T2), increase the energy that the coil 242 can store after receiving an applied pulsed voltage, and also increase a responding vibration when the coil 242 is excited by application of the pulsed voltage. These effects can make a change to be detected in the foreign object detecting process more remarkable, leading to improvement of the detection performance.

Figure 12:
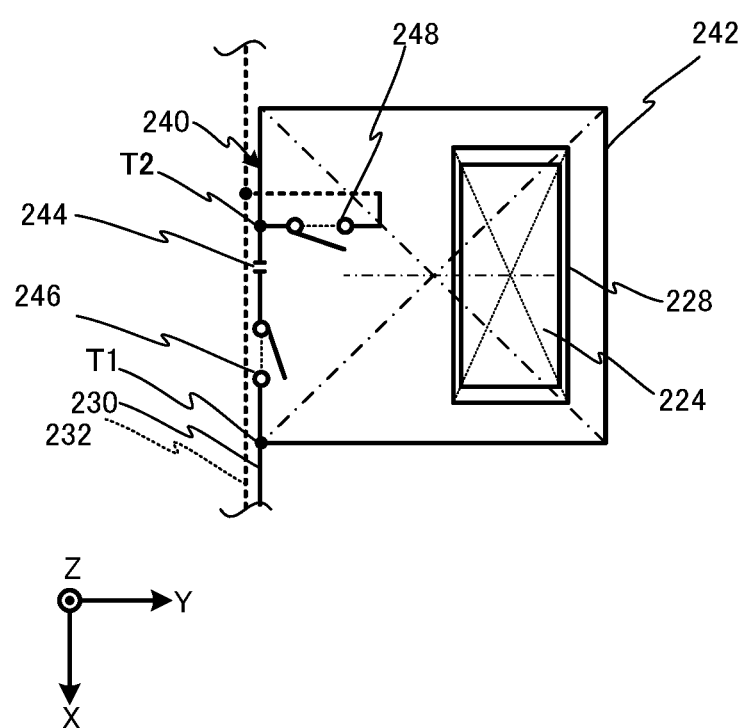
FIG. 12 illustrates a modification of the loop coil illustrated in FIG. 4.
Figure 13:
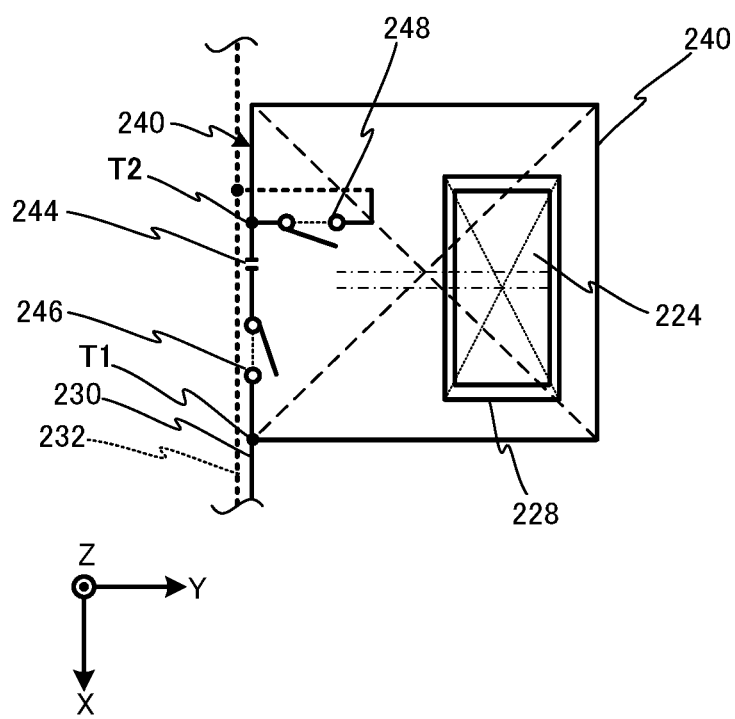
FIG. 13 illustrates a modification of the loop coil illustrated in FIG. 4.
Figure 14:
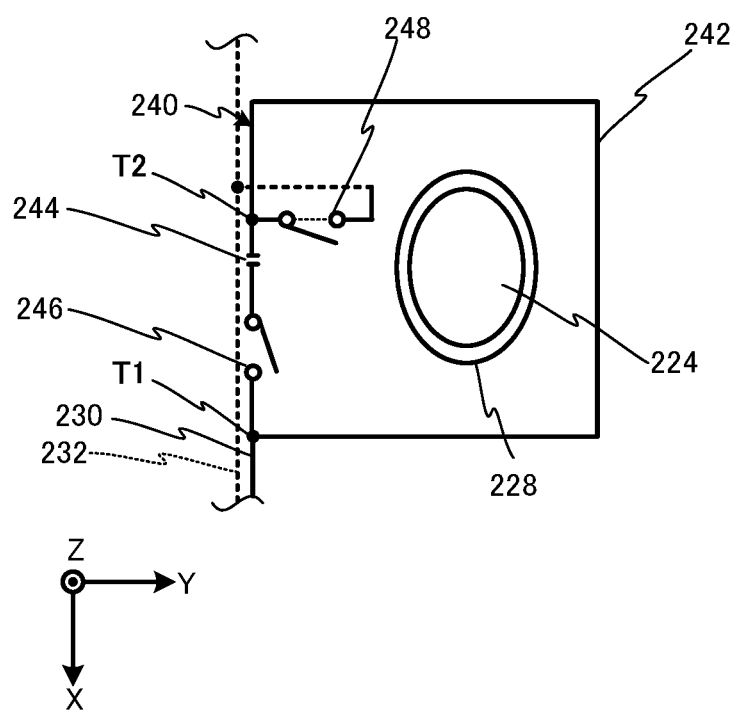
FIG. 14 illustrates a modification of the loop coil illustrated in FIG. 4.

The through hole 228 does not necessarily have a square shape, and may have a rectangular shape in a plan view as illustrated in FIGS. 12 and 13, and may also have an elliptical shape as illustrated in FIG. 14. These structures can also reduce the interval between the loop coils 240 adjacent in the Y direction, thereby ensuring the relatively high accuracy of detection of a foreign object. In these cases, the through holes 228 preferably receive the ribs 224 having shapes corresponding to the shapes of the through holes 228 in a plan view, that is, rectangular and elliptical shapes. If the force applied to the foreign object detection device 20 is not uniform, the longitudinal directions of the ribs 224 may be aligned in the direction of the applied force so as to enhance the strength.

Figure 15:
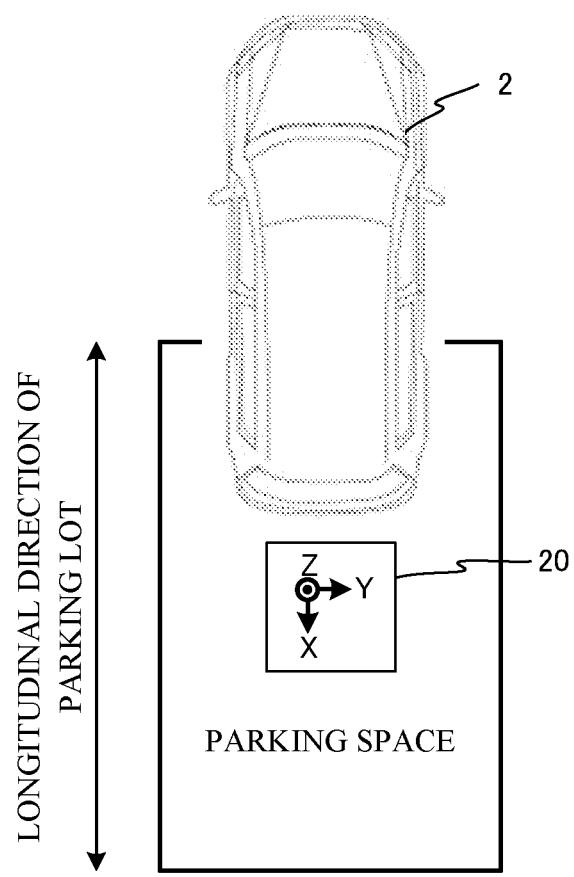
FIG. 15 illustrates exemplary location of the foreign object detection device including the loop coil illustrated in FIGS. 12 to 14.

When a vehicle runs on the detection coil unit 22, the detection coil unit 22 receives a large force in the traveling direction of the vehicle and a relatively small force in the direction orthogonal to the traveling direction of the vehicle, in general. Accordingly, in an exemplary case where the foreign object detection device 20 having any of the structures illustrated in FIGS. 12 to 14 is installed in a parking space, the longitudinal directions of the through holes 228 (long-side directions of the rectangular through holes, or long-axis directions of the elliptical through holes: X-axis direction) in a plan view are preferably aligned in the longitudinal direction of the parking space (or the direction in which the vehicle mainly travels), as illustrated in the schematic diagram of FIG. 15. This structure can enhance the strength of the foreign object detection device 20 while maintaining the high accuracy of detection of a foreign object, and can increase the load resistance when the electric vehicle 2 runs on the foreign object detection device 20. The coincidence does not necessarily indicate the exact coincidence and allows for an error of approximately 0° to ±15°.

Figure 16:
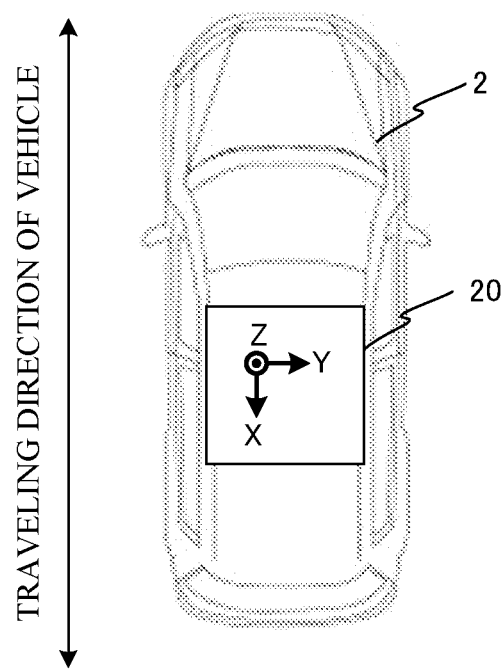
FIG. 16 illustrates exemplary location of the foreign object detection device including the loop coil illustrated in FIGS. 12 to 14.

In another exemplary case where the foreign object detection device 20 having any of the structures illustrated in FIGS. 12 to 14 and the power reception coil unit 13 are installed in a moving body, such as the electric vehicle 2, the longitudinal directions of the through holes 228 (long-side directions of the rectangular through holes, or long-axis directions of the elliptical through holes: X-axis direction) in a plan view are preferably aligned in the straightforward direction of the electric vehicle 2, as illustrated in the schematic diagram of FIG. 16. This structure can enhance the strength in the X-axis direction in which a force due to acceleration is applied, while maintaining the high accuracy of detection of a foreign object. The coincidence does not necessarily indicate the exact coincidence and allows for an error of approximately 0° to ±5°.

FIG. 12 illustrates an example in which the position of the through hole 228 is shifted from the center of the coil 242 to the positive side in the Y direction, and FIG. 13 illustrates an example in which the position of the through hole 228 is shifted from the center of the coil 242 to the positive side in the Y direction and the negative side in the X direction. The through hole 228 illustrated in FIG. 14 may also be shifted in either of these manners. The direction and distance of shift of the through hole 228 may be modified.

Figure 17:
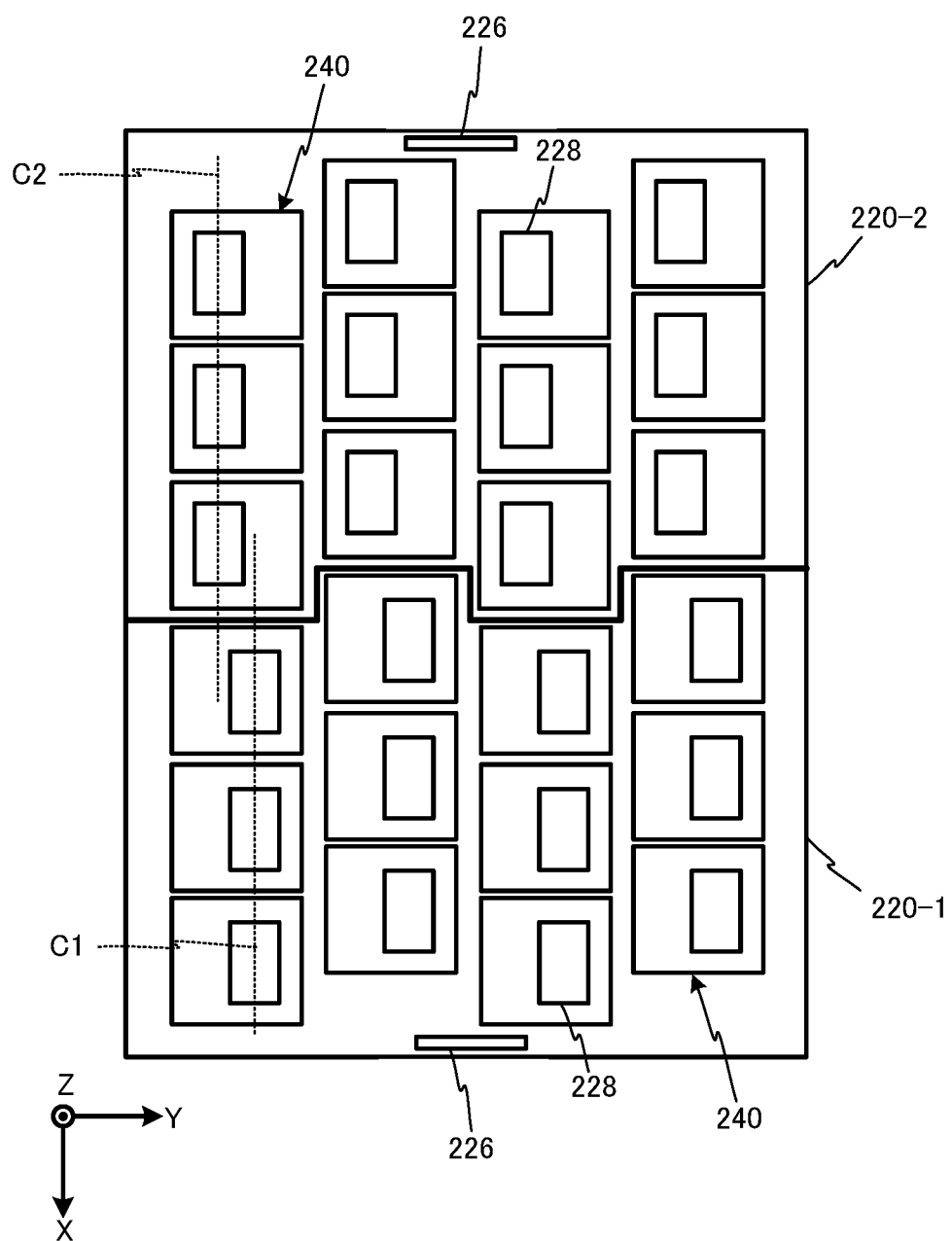
FIG. 17 illustrates a modification of the arrangement of the loop coils illustrated in FIG. 4.

As illustrated in FIG. 17, the centers C of the through holes 228 corresponding to the loop coils 240 arranged in the column direction (X direction) may be shifted depending on the position in the X direction. The structure illustrated in FIG. 17 can be achieved by combining detection coil substrates 220-1 and 220-2 having the identical configuration, for example. In this structure, an imaginary line C1 connecting the centers of the through holes 228 corresponding to the loop coils 240 arranged in a column on the first detection coil substrate 220-1 is not overlapped with the imaginary line C2 connecting the centers of the through holes 228 corresponding to the loop coils 240 arranged in a column on the second detection coil substrate 220-2 as seen in the Z-axis direction. This structure can increase the density of the loop coils 240 while ensuring the large component spaces for accommodating the components and circuits in the individual loop coils 240. In addition, the detection of a foreign object in a large area can be achieved by combining the relatively small detection coil substrates 220-1 and 220-2. The number of detection coil substrates to be combined is not necessarily two and may also be three or larger.

The openings of the loop coils 240 have a square shape in the above-described exemplary configurations, but may have another shape, such as rectangular, elliptical, or circular shape.

The procedure for detecting a foreign object and the circuit configuration may be modified as appropriate. For example, although a pulsed voltage is applied from the pulse generator 24 to the loop coils 240 in the above-described embodiment, the voltage to be applied may also be a sinusoidal signal. Alternatively, the power transmission coil 120 of the power transmission coil unit 12 may be excited, and a pulsed or sinusoidal magnetic field may be applied, for example.

Although the ribs 224 are disposed in the through holes 228 provided in the detection coil substrate 220 in the above-described configurations, which are mere examples, and any other mechanical member or electric element may be provided.

As described above, a foreign object detection device according to an aspect of the present disclosure includes: a detection coil unit including a substrate and a plurality of coils mounted on a first surface of the substrate, each of the coils including a first conductive pattern turned around a first axis orthogonal to the first surface; and a detector connected to the coils to detect the existence of a foreign object on the basis of a vibration signal output when each of the coils is excited. The coils each define an opening, and the substrate includes a through hole and a component space within each of the openings of the coils as seen in a direction of the first axis, the through hole extending through the substrate, the component space accommodating a component or a wire.

The foreign object detection device according to this aspect of the present disclosure can achieve concentrated arrangement of the coils, ensure the high accuracy of detection of a foreign object, and maintain the small area of the substrate.

For example, each of the through holes may have the center deviated from the center of the opening, and the through hole may be disposed at a position further from both ends of the coil than the component space.

For example, the coils may be arranged in a plurality of coil arrays aligned in a second direction, each of the coil arrays including coils aligned in a first direction orthogonal to the first axis, the second direction being orthogonal to the first axis and the first direction, and coils included in one of the coil arrays may be deviated in the first direction from coils included in another of the coil arrays adjacent to the one of the coil arrays in the second direction.

For example, the substrate may include at least a first substrate and a second substrate disposed side by side in the first direction, and an imaginary line connecting the centers of the through holes corresponding to a coil array on the first substrate may have no overlap with an imaginary line connecting the centers of the through holes corresponding to a coil array on the second substrate as seen in the direction of the first axis.

A power transmission device according to another aspect of the present disclosure may include: a power transmission coil including a conductive wire coiled in a flat spiral; and any of the above-described foreign object detection devices, for example.

For example, each of the through holes may have a rectangular shape as seen in the direction of the first axis, and the long-side direction of the through hole may be parallel to the longitudinal direction of a parking space in which the power transmission device is installed.

For example, each of the through holes may have an elliptical shape as seen in the direction of the first axis, and the long-axis direction of the through hole may be parallel to the longitudinal direction of a parking space in which the power transmission device is installed.

A power reception device according to another aspect of the present disclosure may include: a power reception coil including a coiled conductive wire; and any of the above-described foreign object detection devices, for example.

For example, each of the through holes may have a rectangular shape as seen in the direction of the first axis, and the long-side direction of the through hole may be parallel to the straightforward direction of a moving body in which the power reception device is installed.

For example, each of the through holes may have an elliptical shape as seen in the direction of the first axis, and the long-axis direction of the through hole may be parallel to the straightforward direction of a moving body in which the power reception device is installed.

A power transfer system according to another aspect of the present disclosure may include: the above-described power transmission device; and a power reception device, for example. Each of the through holes may have a rectangular or elliptical shape as seen in the direction of the first axis, and the long-side or long-axis direction of the through hole may be parallel to the straightforward direction of a moving body in which the power reception device is installed.

A power transfer system according to another aspect of the present disclosure may include: a power transmission device; and the above-described power reception device, for example. Each of the through holes may have a rectangular or elliptical shape as seen in the direction of the first axis, and the long-side or long-axis direction of the through hole may be parallel to the straightforward direction of a moving body in which the power reception device is installed.

A power transfer system according to another aspect of the present disclosure may include: a power transmission device; and a power reception device, for example. At least one of the power transmission device or the power reception device may include any of the above-described foreign object detection devices.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is widely applicable to a foreign object detection device to detect a foreign object existing in the vicinity of a power transmission coil and a power reception coil, and to a power transmission device, a power reception device, and a power transfer system.

REFERENCE SIGNS LIST

1 Power transfer system
2 Electric vehicle
3 Power transmission device
4 Power reception device
5 Rechargeable battery
11 Power supply device
12 Power transmission coil unit
13 Power reception coil unit
14 Rectifier circuit
15 Commercial power supply
20 Foreign object detection device
22 Detection coil unit
24 Pulse generator
26 Detector
120 Power transmission coil
122 Magnetic plate
130 Power reception coil
132 Magnetic plate
220 Detection coil substrate
222 Case
224 Rib
226 External connector
228 Through hole (opening)
230 First connecting line
232 Second connecting line
240 Loop coil
242 Coil
244 Capacitor
246, 248 Switch
250 Wiring pattern
260 Detection controller
262 Driver
264 Selector
266 Converter
268 Waveform analyzer
270 Result storage
272 Result outputter

The invention claimed is:

1. A foreign object detection device, comprising:
a detection coil unit including a substrate and a plurality of coils mounted on a first surface of the substrate, each of the coils having a first conductive pattern turned around a first axis orthogonal to the first surface; and
a detector connected to the coils to detect existence of a foreign object on basis of a vibration signal output when each of the coils is excited, wherein
the coils each define an opening, and
the substrate has a through hole and a component space within each of the openings of the coils as seen in a direction of the first axis, the through hole extending through the substrate, the component space accommodating a component or a wire.

2. The foreign object detection device according to claim 1, wherein
each of the through holes has a center deviated from a center of the opening as seen in the direction of the first axis, and
the through hole is disposed at a position further from both ends of the coil than the component space.

3. The foreign object detection device according to claim 1, wherein
the coils are arranged in a plurality of coil arrays aligned in a second direction, each of the coil arrays including coils aligned in a first direction orthogonal to the first axis, the second direction being orthogonal to the first axis and the first direction, and
coils included in one of the coil arrays are deviated in the first direction from coils included in another of the coil arrays adjacent to the one of the coil arrays in the second direction.

4. The foreign object detection device according to claim 3, wherein
the substrate comprises at least a first substrate and a second substrate disposed side by side in the first direction, and
an imaginary line connecting centers of the through holes corresponding to a coil array on the first substrate has no overlap with an imaginary line connecting centers of the through holes corresponding to a coil array on the second substrate as seen in the direction of the first axis.

5. A power transmission device, comprising:
a power transmission coil including a coiled conductive wire; and
the foreign object detection device according to claim 1.

6. The power transmission device according to claim 5, wherein
each of the through holes has a rectangular shape as seen in the direction of the first axis, and
a long-side direction of the through hole is parallel to a longitudinal direction of a parking space in which the power transmission device is installed.

7. The power transmission device according to claim 5, wherein
each of the through holes has an elliptical shape as seen in the direction of the first axis, and
a long-axis direction of the through hole is parallel to a longitudinal direction of a parking space in which the power transmission device is installed.

8. A power reception device comprising:
a power reception coil including a coiled conductive wire; and
the foreign object detection device according to claim 1.

9. The power reception device according to claim 8, wherein
each of the through holes has a rectangular shape as seen in the direction of the first axis, and
a long-side direction of the through hole is parallel to a straightforward direction of a moving body in which the power reception device is installed.

10. The power reception device according to claim 8, wherein
each of the through holes has an elliptical shape as seen in the direction of the first axis, and
a long-axis direction of the through hole is parallel to a straightforward direction of a moving body in which the power reception device is installed.

11. A power transfer system, comprising:
the power transmission device according to claim 5; and
a power reception device, wherein
each of the through holes has a rectangular shape as seen in the direction of the first axis, and
a long-side direction of the through hole is parallel to a straightforward direction of a moving body in which the power reception device is installed.

12. A power transfer system, comprising:
the power transmission device according to claim 5; and
a power reception device, wherein
each of the through holes has an elliptical shape as seen in the direction of the first axis, and
a long-axis direction of the through hole is parallel to a straightforward direction of a moving body in which the power reception device is installed.

13. A power transfer system, comprising:
a power transmission device; and
the power reception device according to claim 8, wherein
each of the through holes has a rectangular shape as seen in the direction of the first axis, and
a long-side direction of the through hole is parallel to a straightforward direction of a moving body in which the power reception device is installed.

14. A power transfer system, comprising:
a power transmission device; and
the power reception device according to claim 8, wherein
each of the through holes has an elliptical shape as seen in the direction of the first axis, and
a long-axis direction of the through hole is parallel to a straightforward direction of a moving body in which the power reception device is installed.

15. A power transfer system, comprising:
a power transmission device; and
a power reception device, wherein
at least one of the power transmission device or the power reception device comprises the foreign object detection device according to claim 1.

* * * * *